US010075090B1

(12) United States Patent
Liu et al.

(10) Patent No.: US 10,075,090 B1
(45) Date of Patent: Sep. 11, 2018

(54) AC RECTIFIER SYSTEM

(71) Applicant: NEWVASTEK CO., LTD., New Taipei (TW)

(72) Inventors: Ming Liu, Shanghai (CN); Chengbin Ma, Shanghai (CN); Chih-Hao Chuang, New Taipei (TW); Ming-Liang Fang, New Taipei (TW)

(73) Assignee: NEWVASTEK CO., LTD., New Taipei (TW)

( * ) Notice: Subject to any disclaimer, the term of this patent is extended or adjusted under 35 U.S.C. 154(b) by 0 days.

(21) Appl. No.: 15/662,290

(22) Filed: Jul. 28, 2017

(51) Int. Cl.
*H02M 7/08* (2006.01)
*H02M 1/44* (2007.01)

(52) U.S. Cl.
CPC ............... *H02M 7/08* (2013.01); *H02M 1/44* (2013.01)

(58) Field of Classification Search
CPC ............ H02M 1/12; H02M 1/14; H02M 1/20; H02M 1/22; H02M 1/30; H02M 1/32; H02M 1/44; H02M 1/4208; H02M 1/4266; H02M 3/33576; H02M 3/33592; H02M 5/458; H02M 5/4585; H02M 7/103; H02M 7/106; H02M 7/127; H02M 7/1209; H02M 7/4208; Y02B 70/126; Y02B 70/1475; H02J 9/062
USPC .......... 363/21.06, 37, 38, 44, 48, 52, 61, 84, 363/108, 125
See application file for complete search history.

(56) References Cited

U.S. PATENT DOCUMENTS

| | | | | |
|---|---|---|---|---|
| 6,674,271 B2 * | 1/2004 | Choo | ................ | H02M 3/33561 323/282 |
| 7,315,096 B2 * | 1/2008 | Kuo | ................. | G06F 1/26 307/116 |
| 2004/0085049 A1 * | 5/2004 | Orozco | ................. | H02M 1/081 323/235 |
| 2007/0262650 A1 * | 11/2007 | Li | ................. | H02J 9/062 307/66 |

* cited by examiner

*Primary Examiner* — Yemane Mehari
(74) *Attorney, Agent, or Firm* — Leong C. Lei

(57) ABSTRACT

The AC rectifier system includes an AC source having a positive half-cycle terminal and a negative half-cycle terminal, a first rectifier module along with a first resonance unit having a first terminal connected to the positive half-cycle terminal, a second rectifier module along with a second resonance unit having a first terminal connected to negative half-cycle terminal, a regulator module along with a load element having a first terminal respectively connected to a second terminal of the first rectifier module and a second terminal of the second rectifier module, and a current divider module connected to the positive and negative half-cycle terminals the first terminals of the first and second rectifier modules, and the second terminal of the regulator module. Therefore current would be repeatedly transformed through the current divider module, enhancing heat reduction and transformation efficiency. The resonance units may also function as a filter.

4 Claims, 5 Drawing Sheets

AC RECTIFIER SYSTEM

BACKGROUND OF THE INVENTION

(a) Technical Field of the Invention

The present invention generally relates to AC rectification and, more particularly, to an AC rectifier system that is structurally simple, has few components, produces less heat, and doubles transformation efficiency.

(b) Description of the Prior Art

Wireless power transfer (WPT) which relies on inductive resonance coupling is facing increasing demand, especially for the charging to the mobile devices. Currently WPT has significant progress in the design and application at KHz level, and more effort is invested in achieving lighter and more compact WPT systems with greater transmission distance and higher tolerance to un-aligned coupling coils at the MHz level.

FIG. 1 is an E-type full-wave rectifier system commonly applied to MHz WPT systems. A goal for the rectifier system is to achieve fewer harmonics and higher rectification performance. However, this type of systems requires two diodes for each of the positive and negative half cycles, and the total four diodes would produce heat during rectification. There also may be electromagnetic interference (EMI) affecting nearby components, worsening the heating problem. In addition, signal reception performance for this type of systems is less than satisfactory.

This type of rectifier system indeed has the following shortcomings.

Firstly, more diodes have to be employed, thereby causing more heat.

Secondly, more components are involved, thereby consuming more space.

Thirdly, AC-DC transformation efficiency is inferior.

Fourthly, the heating problem often becomes more serious due to EMI.

SUMMARY OF THE INVENTION

Therefore, a novel rectifier system is provided here that is structurally simple, has few components, produces less heat, and doubles transformation efficiency.

A major objective of the present invention is to simplify the circuit structure and reduce the number of electronic components required.

Another major objective of the present invention is to reduce heat source, lower resonant harmonics, enhance transformation efficiency, and improve EMI problem.

To achieve the above objectives, the rectifier system includes an AC source having a positive half-cycle terminal and a negative half-cycle terminal, a first rectifier module having a first terminal connected to the positive half-cycle terminal, a first resonance unit parallel-connected with the first rectifier module, a second rectifier module having a first terminal connected to negative half-cycle terminal, and a second resonance unit parallel-connected with the second rectifier module. The first and second rectifier modules are jointly connected to a regulator module having a first terminal respectively connected to a second terminal of the first rectifier module and a second terminal of the second rectifier module. A load element is parallel-connected with the regulator module, and a grounding unit is connected to a second terminal of the regulator module. A current divider module is connected to the output of the regulator module and includes a first divider unit and a second divider unit. The first divider unit is connected to the positive half-cycle terminal and the first rectifier module, and the second divider unit is connected to the negative half-cycle terminal and the second rectifier module.

During the positive half-cycle of the AC voltage, current flows out of the positive half-cycle terminal and undergoes a first transformation by the first rectifier module and the first resonance unit. Current then flow through the regulator module and the load element, and towards the current divider module. Half of the current flows through the second divider unit towards the negative half-cycle terminal, whereas another half of the current flows again towards the first rectifier module for a second transformation. During the negative half-cycle of the AC voltage, a similar process occurs. For the entire rectification process, only the first and second rectifier modules would produce heat and the current, on the other hand, would be repeatedly transformed.

With the present invention, the shortcomings of the prior art such as requiring more diodes, more complex structure, more bulky form factor, but inferior transformation efficiency are addressed and improved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
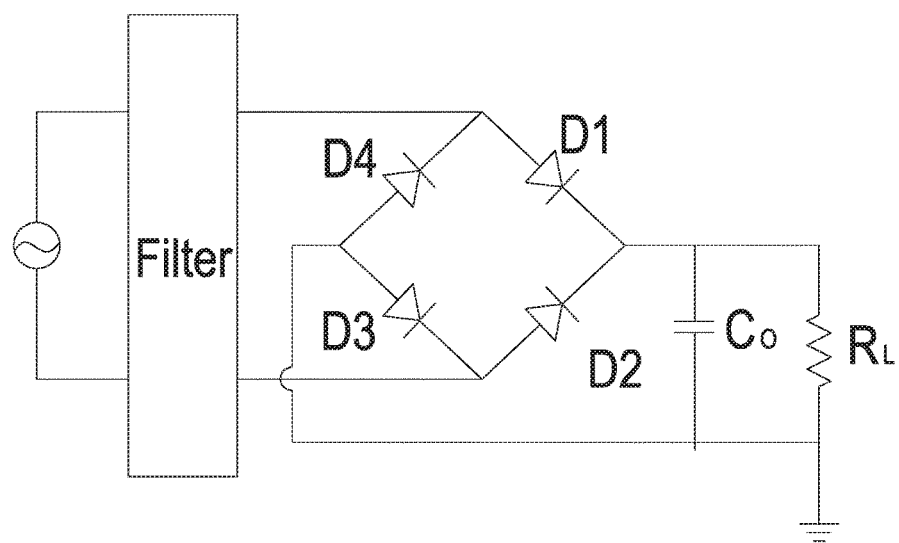
FIG. 1 is a circuit diagram showing a conventional AC rectifier circuit.
Figure 2:
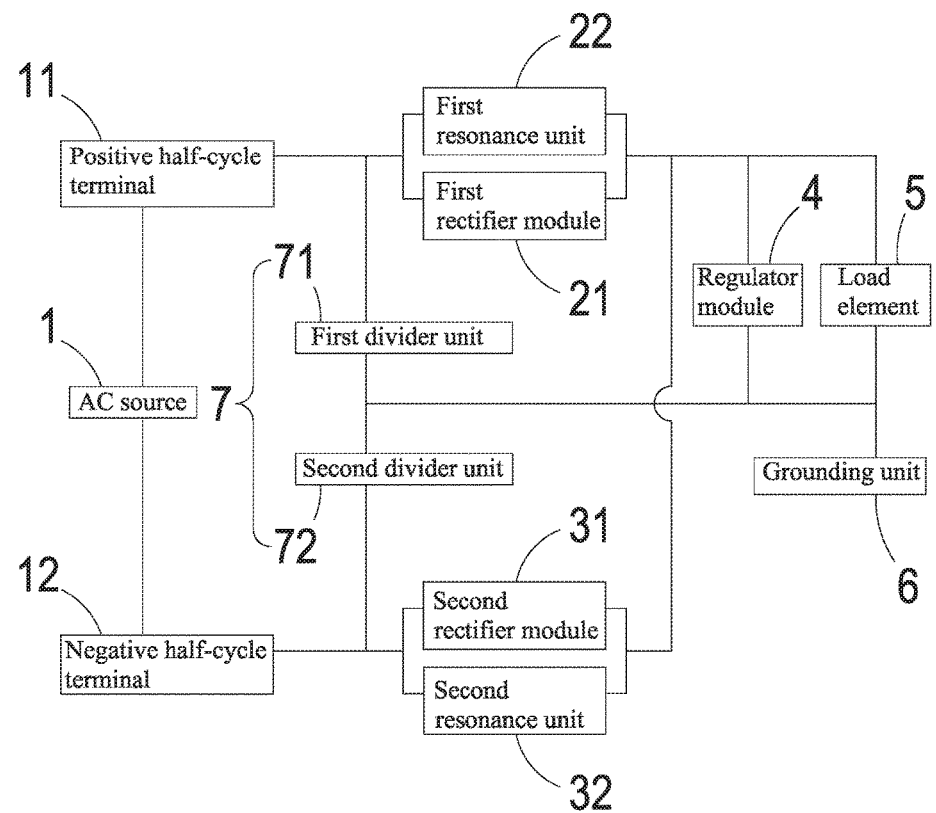
FIG. 2 is a functional block diagram showing the components of the present invention.

As shown in FIG. 2, a rectifier system according to the present invention includes the following components.

There is an AC source 1 having a positive half-cycle terminal 11 and a negative half-cycle terminal 12.

There is a first rectifier module 21 having a first terminal connected to the positive half-cycle terminal 11.

There is a first resonance unit 22 parallel-connected with the first rectifier module 21. The first resonance unit 22 is a capacitor.

There is a second rectifier module 31 having a first terminal connected to negative half-cycle terminal 12.

There is a second resonance unit 32 parallel-connected with the second rectifier module 31. The second resonance unit 32 is a capacitor.

There is a regulator module 4 having a first terminal respectively connected to a second terminal of the first rectifier module 21 and a second terminal of the second rectifier module 31. The regulator module 4 includes at least a regulator capacitor.

There is a load element 5 parallel-connected with the regulator module 4. The load element 5 includes at least a resistor.

There is a grounding unit 6 connected to a second terminal of the regulator module 4.

There is a current divider module 7 including a first divider unit 71 and a second divider unit 72. The first divider unit 71 has a first terminal connected to the positive half-cycle terminal 11 and the first terminal of the first rectifier module 21. The second divider unit 71 has a first terminal connected to the negative half-cycle terminal 12 and the first terminal of the second rectifier module 31. The first and second divider units 71 and 72 are inductors and have their second terminals connected together and to the second terminal of the regulator module 4.

Figure 5:
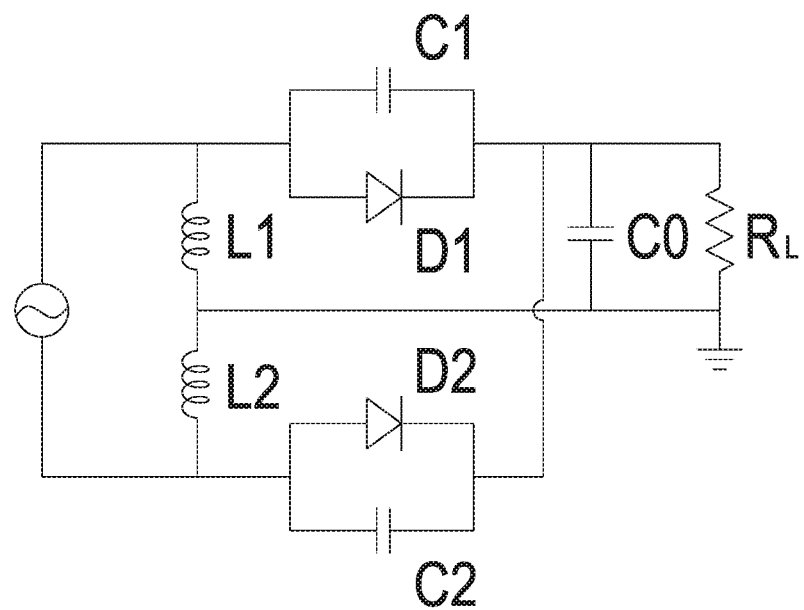
FIG. 5 is a circuit diagram showing an embodiment of a rectifier system according to the present invention.

As shown in FIG. 5 which is a circuit diagram for an embodiment of the present invention, one can see that the present embodiment adopts only a few electrical components. The first and second rectifier modules 21 and 31 correspond to the two diodes D1 and D2 of FIG. 5, respectively. The first and second resonance units 22 and 32 correspond to the two capacitors C1 and C2 of FIG. 5, respectively. The first and second divider units 71 and 72 of the current divider module 7 correspond to the two inductors L1 and L2 of FIG. 5, respectively. The regulator module 4 and the load element 5 correspond to the capacitor C0 and the resistor $R_L$, respectively. The AC source 1 may represent any circuit connected to the present embodiment. The rectifier system of the present embodiment, therefore, has a small form factor and simple components.

Figure 3:
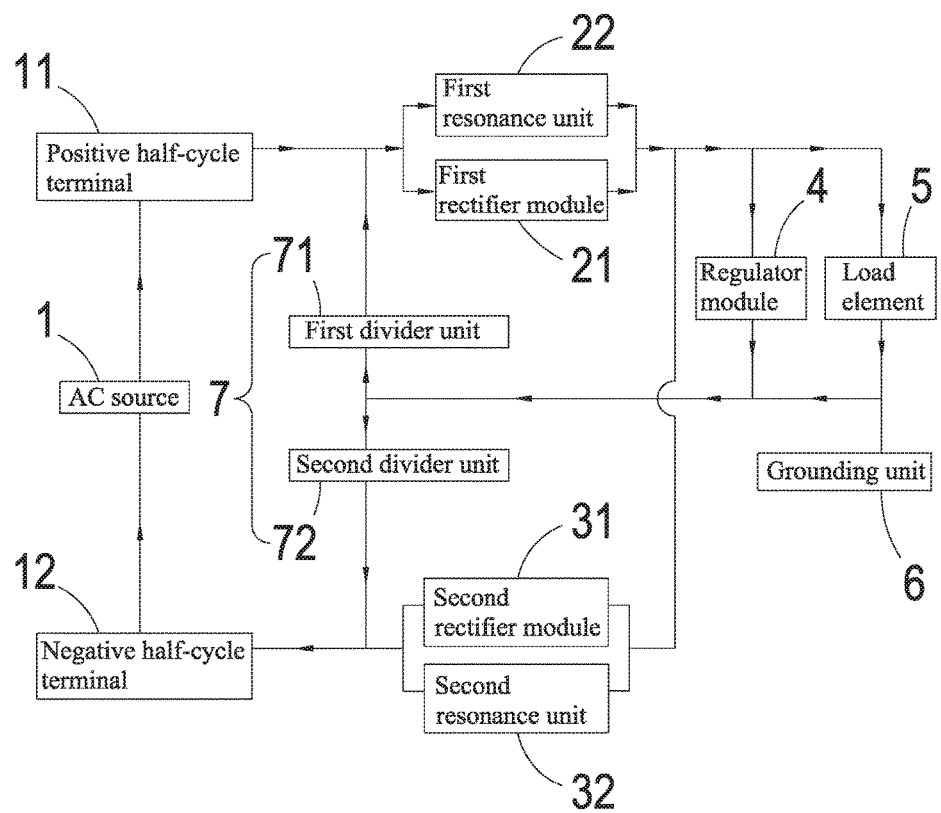
FIG. 3 is a schematic diagram showing the current flow during the positive half cycle of AC voltage according to the present invention.
Figure 4:
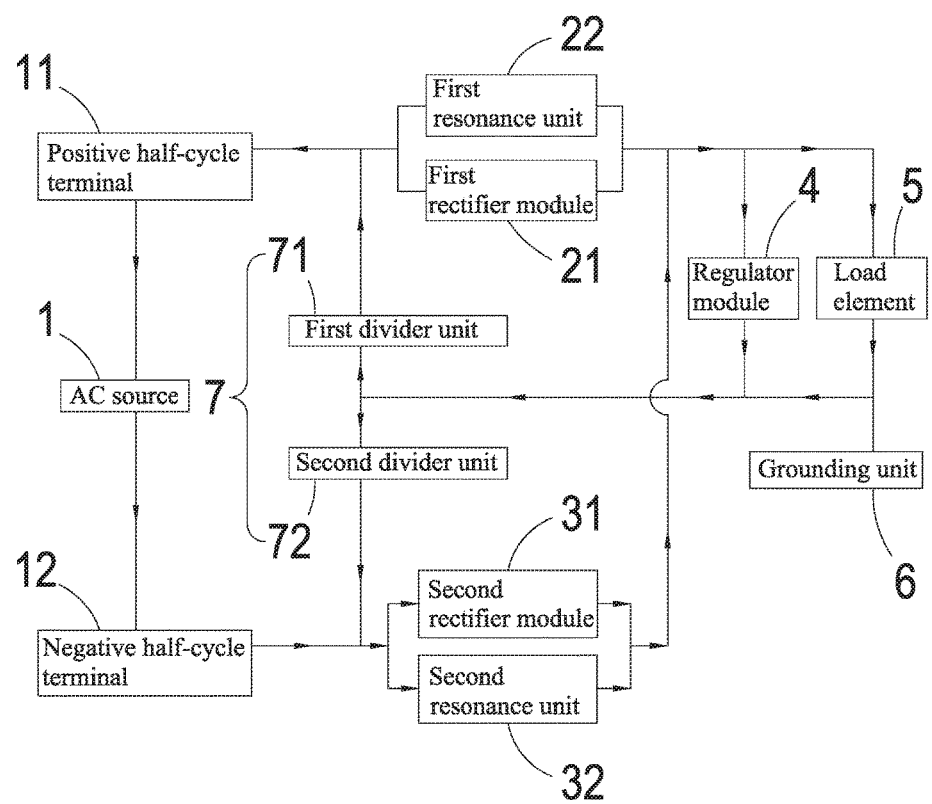
FIG. 4 is a schematic diagram showing the current flow during the negative half cycle of AC voltage according to the present invention.

The operation of the present invention is as follows. As shown in FIG. 3, during the positive half-cycle of the AC voltage, current flows out of the positive half-cycle terminal 11, and undergoes a first transformation by the first rectifier module 21 and the first resonance unit 22, where EMI (electromagnetic interference) strength and heating issue resulted from EMI are both reduced and lessened by the first resonance unit 22. The first resonance unit 22 may also be used as a filter by appropriate adjusting the capacitance of the first resonance unit 22. Current then flow through the regulator module 4 and the load element 5, and towards the current divider module 7. The first and second divider units 71 and 72 have an identical impedance. Therefore half of the current flows through the second divider unit 72 towards the negative half-cycle terminal 12, whereas another half of the current flows again towards the first rectifier module 21 for a second transformation. During the negative half-cycle of the AC voltage, a similar process occurs as shown in FIG. 4 where half of the current flows through the first divider unit 71 towards the positive half-cycle terminal 11, whereas another half of the current flows towards the second rectifier module 31 for the second transformation.

For the entire rectification process, only the first and second rectifier modules 21 and 31 would produce heat. The overall heat produced and power consumption is reduced. The current, on the other hand, would be repeatedly transformed. Due to the current divider module 7, half of the current flowing back to the first and second rectifier modules 21 and 31 would be transformed again, and half of that would be transformed again, and the process may continue as such. According to the equation for the sum of infinite series as $$\frac{1}{2} + \frac{1}{4} + \frac{1}{8} + \frac{1}{16} + \ldots = \frac{\frac{1}{2}}{1-\left(+\frac{1}{2}\right)} = 1$$

the transformation efficiency of the present invention by combining the positive and negative cycles, therefore, would be doubled.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A rectifier system, comprising:
an AC source having a positive half-cycle terminal and a negative half-cycle terminal;
a first rectifier module having a first terminal connected to the positive half-cycle terminal;
a first resonance unit parallel-connected with the first rectifier module;
a second rectifier module having a first terminal connected to the negative half-cycle terminal;
a second resonance unit parallel-connected with the second rectifier module;
a regulator module having a first terminal respectively connected to a second terminal of the first rectifier module and a second terminal of the second rectifier module;
a load element parallel-connected with the regulator module;
a grounding unit connected to a second terminal of the regulator module; and
a current divider module comprising a first divider unit and a second divider unit, where the first divider unit has a first terminal connected to the positive half-cycle terminal and the first terminal of the first rectifier module, the second divider unit has a first terminal connected to the negative half-cycle terminal and the first terminal of the second rectifier module, the first and second divider units have their second terminals connected together and to the second terminal of the regulator module, and each of the first and second divider units comprises an inductor,
wherein the first and second divider units have an identical impedance so that, for a current flowing through the regulator module and the load element, half of the current flows through the second divider unit towards the negative half-cycle terminal, and another half of the current flows again towards the first rectifier module, both undergoing a second transformation.

2. The rectifier system according to claim 1, wherein the regulator module comprises at least a regulator capacitor.

3. The rectifier system according to claim 1, wherein the load element comprises at least a resistor.

4. The rectifier system according to claim 1, wherein each of the first and second resonance units is a capacitor.

* * * * *